(12) United States Patent
Kim et al.

(10) Patent No.: US 8,609,764 B2
(45) Date of Patent: Dec. 17, 2013

(54) POLARIZER HAVING EXCELLENT DURABILITY, POLARIZING PLATE AND METHODS OF PRODUCING THE POLARIZER AND THE POLARIZING PLATE

(75) Inventors: Seung Ae Kim, Daejeon (KR); Ki Ok Kwon, Daejeon (KR); Kyun Il Rah, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/226,066

(22) PCT Filed: Feb. 4, 2008

(86) PCT No.: PCT/KR2008/000689
§ 371 (c)(1),
(2), (4) Date: Oct. 7, 2008

(87) PCT Pub. No.: WO2008/097007
PCT Pub. Date: Aug. 14, 2008

(65) Prior Publication Data
US 2009/0306293 A1    Dec. 10, 2009

(30) Foreign Application Priority Data
Feb. 9, 2007    (KR) .................. 10-2007-0013736

(51) Int. Cl.
*C08F 8/00*    (2006.01)

(52) U.S. Cl.
USPC .............. 525/61; 264/1.31; 264/1.34; 349/96; 359/487.02; 525/56

(58) Field of Classification Search
USPC ......... 349/96; 524/414, 416, 417; 525/56, 61; 264/1.31, 1.34; 359/487.02
See application file for complete search history.

(56) References Cited

U.S. PATENT DOCUMENTS

| 2,892,383 A * | 6/1959 | Walworth et al. ............. 430/199 |
| 5,666,223 A * | 9/1997 | Bennett et al. ................ 359/490 |
| 5,973,834 A * | 10/1999 | Kadaba et al. ................ 359/490 |
| 2006/0028725 A1 | 2/2006 | Gerlach et al. |
| 2006/0144514 A1 | 7/2006 | Wang et al. |

FOREIGN PATENT DOCUMENTS

| CN | 1768095 A | 5/2006 |
| JP | 56106201 | 8/1981 |
| JP | 02-249705 | 10/1990 |
| JP | 06-118231 | 4/1994 |
| JP | 2000-35512 | 2/2000 |
| JP | 2003035819 | 2/2003 |
| JP | 2006-011409 | 1/2006 |
| KR | 10-2005-7018 | * 2/2006 |
| KR | 1020060014372 | 2/2006 |
| TW | 200636304 A | 10/2006 |
| TW | 200639454 A | 11/2006 |
| WO | WO 2004/094510 A1 | 11/2004 |

OTHER PUBLICATIONS

"Ionic conduction in partially phosphorylated poly(vinyl alcohol) as polymer electrolytes"; Suzuki, et al; Polymer 41 (2000) pp. 4531-4536.

* cited by examiner

*Primary Examiner* — David W Wu
*Assistant Examiner* — Marie Reddick
(74) *Attorney, Agent, or Firm* — McKenna Long & Aldridge, LLP

(57) ABSTRACT

There is provided a method of producing a polyvinyl alcohol (PVA) film polarizer having an excellent durability, the method comprising dyeing, cross-linking, stretching, and drying, wherein additives containing phosphorus is inputted into one or more of the dyeing, the cross-linking, and the stretching. In this case, the additives containing phosphorus may be selected from a group consisting of a phosphoric acid, potassium phosphate monobasic, potassium phosphate dibasic, magnesium phosphate dibasic, sodium phosphate monobasic, and ammonium phosphate monobasic. An amount of the additives containing phosphorus in an added solution may be 0.01 to 15 wt %. As described above, when inputting the additives containing phosphorus while producing a polarizer, cross-linking between iodine and a polymer matrix becomes strong due to the phosphorus contained in the additives, thereby producing a polarizer having an excellent durability, and particularly, an excellent thermal stability.

7 Claims, No Drawings

POLARIZER HAVING EXCELLENT DURABILITY, POLARIZING PLATE AND METHODS OF PRODUCING THE POLARIZER AND THE POLARIZING PLATE

This application claims the benefit of PCT/KR2008/000689, filed on Feb. 4, 2008 and also Korean Patent Application No. 10-2007-0013736 filed on Feb. 9, 2007, the contents of which is hereby incorporated herein by reference in their entirety.

TECHNICAL FIELD

The present invention relates to methods of producing a polarizer and a polarizing plate, and more particularly, to methods of producing a polarizer and a polarizing plate used in an image display apparatus such as a liquid crystal display (LCD), an organic light emitting display (OLED), and a plasma display panel (PDP) and having an excellent durability.

BACKGROUND ART

Generally, polarizing plates used in image display apparatuses require having both of a high transmittance and a high degree of polarization to provide an image, which is bright, with excellent color reproduction characteristics. In general, such polarizing plates are produced by dyeing a conventional polyvinyl alcohol (PVA)-based film using dichroic iodine or dichroic dyestuffs and orienting the film by uniaxially stretching.

In the past, image display apparatuses employing a polarizing plate were generally used in small products such as electronic calculators and electronic watches. However, recently, image display apparatuses are used in almost all industrial fields such as televisions, monitors, dashboards, and display boards of all kinds of machines for office or industrial uses. According to increase of an area where image display apparatuses are used, the number of times when using image display apparatuses in a harsh environment such as high temperature and high humidity in a long time becomes increased. Accordingly, to show functions thereof in such harsh environments, it is required to develop a polarizing plate having an excellent thermal stability and durability.

As conventional methods used for improving a durability of a polarizing plate, there are a method of modifying a PVA-based film itself and a method of using dichroic dyestuffs that is not sublimate instead of an iodine-based polarizer that is sublimate.

In the case of the method of modifying a PVA-based film, a degree of polarization may be decreased since iodine or dichroic dyestuffs are not fully adsorbed onto a polymer matrix due to a modification of PVA or transmittance may be decreased due to a modification of a matrix. In the case of the method of using dichroic dyestuffs, a sufficient degree of polarization may not be obtained since it is difficult to control orientation while stretching PVA.

On the other hand, as another method of improving a durability of a polarizing plate, Japanese Patent Laid-Open Publication No. 2002-35512 discloses a method of producing a polarizer using a PVA film containing an appropriate amount of zinc. According to the method, when producing a polarizer by adding zinc, a durability of a polarizing plate is improved, thereby preventing red discoloration of cross nicols, a polarization defect of a long wavelength light, occurring at high temperature. However, when drying the polarizer, a boric acid is educed, thereby causing external defects.

DISCLOSURE OF INVENTION

Technical Problem

An aspect of the present invention provides a polarizer with an excellent durability, which does not deteriorate a degree of polarization and transmittance, has no external defect, and maintains transmittance, the degree of polarization, and color at high temperature, and a method of producing the polarizer.

To achieve the object of the present invention, the present inventors investigated several times, thereby detecting that a polarizing plate with an excellent durability, and particularly, with an excellent thermal stability is capable of being produced by inputting additives containing phosphorus while producing the polarizing plate due to a strong cross-link between iodine and a polymer matrix by phosphorus.

Technical Solution

According to an aspect of the present invention, there is provided a method of producing a polyvinyl alcohol (PVA) film polarizer having an excellent durability, the method comprising dyeing, cross-linking, stretching, and drying, wherein additives containing phosphorus is inputted into one or more of the dyeing, the cross-linking, and the stretching.

In this case, the additives containing phosphorus may be selected from a group consisting of a phosphoric acid, potassium phosphate monobasic, potassium phosphate dibasic, magnesium phosphate dibasic, sodium phosphate monobasic, and ammonium phosphate monobasic. An amount of the additives containing phosphorus in an added solution may be 0.01 to 15 wt %.

According to another aspect of the present invention, there is provided a method of producing a polarizing plate with an excellent durability by attaching a protection film to both sides of the polarizer produced according to the method as described above.

According to still another aspect of the present invention, there is provided a polarizing plate with an excellent durability, which contains phosphorus and is produced according to the method.

BEST MODE FOR CARRYING OUT THE INVENTION

Hereinafter, methods of producing a polarizer and polarizing plate according to an exemplary embodiment of the present invention will be described in detail.

Method of Producing Polarizer (1) Dyeing

A polyvinyl alcohol-based film is dyed using iodine or dyestuffs.

The dyeing is performed to allow iodine molecules having dichroism or dyestuffs molecules to be dyed onto the polyvinyl alcohol-based film. The iodine molecules or the dyestuff molecules absorbs light oscillating in a stretching direction of a polarizing plate and allows light perpendicularly oscillating to be transmitted, thereby obtaining a polarized light having a particular oscillation direction.

Generally, a dyeing is completed by impregnating a polyvinyl alcohol-based film with an iodine solution. In the present dyeing, a temperature of the iodine solution is generally from 20 to 50° C. and an impregnation time is within a range of 10 to 300 seconds.

On the other hand, when using an aqueous iodine solution as the iodine solution, the aqueous iodine solution may contain iondine and iodide ions such as potassium iodine used as solubilizing agent. In this case, a concentration of the iodine in the iodine solution may be 0.01 to 0.5 wt %, and a concentration of the potassium iodide in the iodine solution may be 0.01 to 10 wt %.

(2) Cross-Linking

When the iodine molecules or dyestuff molecules are dyed onto the polyvinyl alcohol-based film in the dyeing, the iodine molecules or dyestuff molecules are adsorbed onto a polymer matrix of the polyvinyl alcohol-based film by using a boric acid and borates. When the iodine molecules are not well adsorbed onto the polymer matrix, the degree of polarization decreases and the polarizing plate is incapable of performing properly.

As a method of cross-linking, there is generally used a soaking method by depositing the polyvinyl alcohol-based film in an aqueous boric acid solution. However, the cross-linking may be performed by an coating method or atomization method by spraying the aqueous boric acid solution onto the polyvinyl alcohol-based film.

When performing the cross-linking by using the soaking, a concentration of a boric acid in the aqueous boric acid solution may be 2 to 15 wt %, and more particularly, 3 to 10 wt % and a temperature of the aqueous boric acid solution may be 20° C. or more, and particularly, 30 to 85° C. Also, an impregnation time may be generally 100 to 1200 seconds, and more particularly, 200 to 500 seconds.

On the other hand, iodide ions may be contained in the aqueous boric acid solution by adding a potassium iodide in the aqueous boric acid solution. When using the aqueous boric acid solution containing the iodide ions, a neutral gray polarizer providing an approximate regular absorbance with respect to all wavelength areas of visible light may be obtained.

(3) Stretching

A stretching indicates that a film is stretched in a uniaxial direction to orient polymers of the film in a certain direction. Stretching methods may be divided into a wet-stretching and dry-stretching. The dry-stretching is divided into an inter-roll stretching, a heating roll stretching, a compression stretching, and a tenter stretching. The wet-stretching is divided into a tenter stretching and an inter-roll stretching.

In the present invention, the stretching method is not particularly limited. All of the wet-stretching methods and dry-stretching methods may be used. A mixing method thereof may be used when necessary.

The stretching may be performed simultaneously with or separated from the dyeing or the cross-linking.

When the stretching is performed simultaneously with the dyeing, the stretching may be performed in the iodine solution. When the stretching is performed simultaneously with the cross-linking, the stretching may be performed in the aqueous boric acid solution.

(4) Adding Additives Containing Phosphorus

The additives containing phosphorus are added in one or more of the dyeing, cross-linking, and stretching. The additives containing phosphorus may be inputted in anyone of the dyeing, cross-linking, and stretching, and more particularly, in two or more thereof.

The additives containing phosphorus may be inputted into a previously prepared aqueous solution, that is, the aqueous solution containing the iodine and potassium iodide in the dyeing or the aqueous boric acid solution in the cross-linking or may be inputted together with the iodine, potassium iodides, and boric acid when preparing an aqueous solution of each of the dyeing, cross-linking, and stretching.

As the additives containing phosphorus, there may be used a phosphoric acid, potassium phosphate monobasic, potassium phosphate dibasic, magnesium phosphate dibasic, sodium phosphate monobasic, and ammonium phosphate monobasic. The content thereof may be 0.01 to 15 wt % of an added aqueous solution. When the content of the additives is less than 0.01 wt %, there is just an insignificant effect of improving durability. When the content of the additives is more than 15 wt %, external defects may be caused by a residual of the additives on a surface after drying.

(5) Drying

When the dyeing, cross-linking, and stretching of the polyvinyl alcohol-based film are completed, the polyvinyl alcohol-based film is put in an oven and dried, thereby obtaining a polarizer.

The polarizer produced according to the method including the inputting the additives containing phosphorus includes phosphorus as a constituent thereof. The phosphorus contained in the polarizer strongly cross-links the iodine and the polymer matrix. As a result, different from conventional polarizers, the polarizer containing phosphorus according to an exemplary embodiment of the present invention may have an excellent durability at high temperature, in which there is little change in optical properties such as transmittance, a degree of polarization, and a color change rate.

Method of Producing Polarizing Plate

The polarizing plate is produced by depositing a protection film on both sides of the polarizer produced via the process by using adhesives.

The protection film indicates a transparent film attached to both sides of a polarizer to protect the polarizer. As the protection film, there may be used an acetate-based resin film such as a triacetyl cellulose (TAC) film, a polyester-based resin film, a polyethersulfone-based resin film, a polycarbonate-based resin film, a polyamide-based resin film, a polyimide-based resin film, and a polyolefin-based resin film.

Similar to the polarizer, the polarizing plate produced according to an exemplary embodiment of the present invention has a feature of including phosphorus. As described above, the phosphorus contained in the polarizing plate allows cross-link between the iodine and polymer matrix, thereby improving a durability of the polarizing plate.

MODE FOR THE INVENTION

Hereinafter, it will be shown via detailed examples that transmittance, a degree of polarization, and a color change rate of the polarizing plate produced according to an exemplary embodiment of the present invention do not greatly change at high temperature. The following examples are just examples and do not limit the present invention.

Comparative Example 1

A PVA film is soaked and dyed in a dyeing bath having an aqueous solution containing 0.1 wt % of iodide and 1 wt % of potassium iodides therein (A. Dyeing). The dyed PVA film is soaked in 3 wt % of a boric acid solution containing 5 wt % of potassium iodides at a temperature of 50° C. and is stretched to five times its length (B. Cross-linking and Stretching). A PVA polarizer obtained via the process is put in an oven and dried at a temperature of 80° C. for five minutes.

When the drying of the PVA polarizer is finished, a TAC film (FUJIFILM Corporation) is attached to both sides of the polarizer to produce a polarizing plate.

Example 1

A polarizing plate is produced by a method similar to the method of Comparative Example 1, except for adding potassium phosphate monobasic to the aqueous solution containing the iodide and potassium iodides to 1 wt % thereof in the Dyeing (A).

Example 2

A polarizing plate is produced by a method similar to the method of Comparative Example 1, except for adding potassium phosphate monobasic to the aqueous boric acid solution to 7 wt % thereof in the Cross-linking and Stretching (B).

Example 3

A polarizing plate is produced by a method similar to the method of Comparative Example 1, except for adding ammonium phosphate monobasic to the aqueous solution containing the iodide and potassium iodides to 5 wt % thereof in the Dyeing (A) and adding ammonium phosphate monobasic to the aqueous boric acid solution to 5 wt % thereof in the Cross-linking and Stretching (B), respectively.

Example 4

A polarizing plate is produced by a method similar to the method of Comparative Example 1, except for adding a phosphoric acid to the aqueous boric acid solution to 3 wt % thereof in the Cross-linking and Stretching (B).

Example 5

A polarizing plate is produced by a method similar to the method of Comparative Example 1, except for adding a phosphoric acid to the aqueous solution containing the iodide and potassium iodides to 0.5 wt % thereof in the Dyeing (A) and adding a phosphoric acid to the aqueous boric acid solution to 0.5 wt % thereof in the Cross-linking and Stretching (B), respectively.

Experimental Example

Test for Thermal Stability

The polarizing plates produced according to the methods of Comparative Example 1 and Examples 1 to 5 were cut into a size of 50×50 mm and attached to glass using an acrylic adhesive. Initial optical properties such as singleton transmittance Ts, cross transmittance Tc, singleton colors a and b were measured, and the optical properties were measured again after leaving the polarizing plates in an oven with a temperature of 100° C. for 500 hours. The optical properties before and after heating were compared with each other and shown in following Table 1.

The optical properties were measured N&K analyzer (N&K Technology Inc.). The singleton transmittances s Ts and the singleton colors a and b were measured using one polarizing plate. The cross transmittance Tc were measured after cutting one polarizing plate in a stretching direction and another polarizing plate orthogonally to the stretching direction and allowing the two cut polarizing plates to cross each other at right angles in such as way that an absorption axis is 90°.

Amounts of changes in thermal stabilities were calculated as follows.

$T_s(\%) = (T_s \text{ after heating} - T_s \text{ before heating})/(T_s \text{ before heating}) \times 100$ $T_c(\%) = (T_c \text{ after heating} - T_c \text{ before heating})/(T_x \text{ before heating}) \times 100$ $a(\%) = (a \text{ after heating} - a \text{ before heating})/(a \text{ before heating}) \times 100$ $b(\%) = (b \text{ after heating} - b \text{ before heating})/(b \text{ before heating}) \times 100$ Ts relative change rate = $T_s(\%)$ of each of Examples/$T_s(\%)$ of Comparative Example 1

$T_c$ relative change rate = $T_c(\%)$ of each of Examples/$T_s(\%)$ of Comparative Example 1 a relative change rate = $a(\%)$ of each of Examples/$a(\%)$ of Comparative Example 1 b relative change rate = $b(\%)$ of each of Examples/$b(\%)$ of Comparative Example 1

TABLE 1

Amount of change after heating at 100° C. for 500 hours

| | Singleton transmittances | | | Cross transmittance |
|---|---|---|---|---|
| | Ts relative change rate | Color a change rate | Color b change rate | Tc relative change rate |
| Example 1 | 0.93 | 0.95 | 0.90 | 0.81 |
| Example 2 | 0.80 | 0.85 | 0.71 | 0.40 |
| Example 3 | 0.81 | 0.85 | 0.75 | 0.46 |
| Example 4 | 0.83 | 0.87 | 0.74 | 0.57 |
| Example 5 | 0.96 | 0.97 | 0.94 | 0.78 |
| Comparative Example 1 | 1.00 | 1.00 | 1.00 | 1.00 |

Referring to Table 1, it may known that the change rates of the singleton transmittance, colors, cross transmittance of the polarizing plates produced according to the methods of Examples 1 to 5 in which additives containing phosphorus are added while producing the polarizing plates are smaller than those of the polarizing plate produced according to the method of Comparative Examples. As described above, the polarizing plates produced according to the present invention have a more excellent durability than the conventional polarizing plate, in which change in the optical properties is small at high temperature, thereby being normally used in harsh environments.

Also, the change rates of the singleton transmittance, colors, and the cross transmittance of the polarizing plates according to examples 2 and 3 which contain increased amount of additives containing phosphorous were smaller. Accordingly, it may be known that the larger amount of the additives containing phosphorus the more excellent a durability of a polarizing plate becomes.

INDUSTRIAL APPLICABILITY

An aspect of the present invention provides a polarizing plate with an excellent durability in which iodine is capable of being strongly adsorbed to a polymer matrix by inputting additives containing phosphorus while producing a polarizer, thereby improving a durability of the polarizer in such a way that there are just small change in transmittance, a degree of polarization, and color at high temperature.

Also, there is provided a method of producing a polarizing plate with no external defect and with high transmittance and degree of polarization by limiting an amount of additives containing phosphorus.

The invention claimed is:

1. A method of producing a polyvinyl alcohol (PVA) film polarizer having an excellent durability, the method comprising dyeing, cross-linking, stretching, and drying a polyvinyl alcohol film, wherein additives containing phosphorus, which are selected from the group consisting of phosphoric acid, potassium phosphate monobasic, potassium phosphate dibasic, magnesium phosphate dibasic, sodium phosphate monobasic, and ammonium phosphate monobasic, are inputted into one or more of the dyeing, the cross-linking, and the stretching of the polyvinyl alcohol film and are inputted into an aqueous iodide solution or an aqueous potassium iodide solution in the dyeing and/or an aqueous boric acid solution in the cross-linking; and wherein the additives containing phosphorus crosslink with a polymer matrix in the polyvinyl alcohol film to remain in the polarizer.

2. The method of claim 1, wherein an amount of the additives containing phosphorus in an added solution is 0.01 to 15 wt % based on the total weight of the added solution.

3. A PVA film polarizer having an excellent durability, the PVA film polarizer produced by using the method according to any one of claims 1 and 2.

4. A method of producing a PVA film polarizing plate having an excellent durability, the method comprising: dyeing, cross-linking, stretching, and drying a polyvinyl alcohol film, and attaching a protection film to the polyvinyl alcohol film, wherein additives containing phosphorus, which are selected from the group consisting of phosphoric acid, potassium phosphate monobasic, potassium phosphate dibasic, magnesium phosphate dibasic, sodium phosphate monobasic, and ammonium phosphate monobasic, are inputted into one or more of the dyeing, the cross-linking, and the stretching of the polyvinyl alcohol film and are inputted into an aqueous iodide solution or an aqueous potassium iodide solution in the dyeing and/or an aqueous boric acid solution in the cross-linking; and wherein the additives containing phosphorus crosslink with a polymer matrix in the polyvinyl alcohol film to remain in the polarizer.

5. The method of claim 4, wherein an amount of the additives containing phosphorus in an added solution is 0.01 to 15 wt % based on the total weight of the added solution.

6. The method of claim 4, wherein the protection film is selected from the group consisting of an acetate-based resin film, a polyester-based resin film, a polyethersulfone-based resin film, a polycarbonate-based resin film, a polyamide-based resin film, a polyimide-based resin film, and a polyolefin-based resin film.

7. A PVA film polarizing plate with an excellent durability, the PVA film polarizing plate produced by using the method according to any one of claims 4, 5, and 6.

* * * * *